United States Patent
Pfeil

(10) Patent No.: US 9,004,731 B2
(45) Date of Patent: Apr. 14, 2015

(54) ILLUMINATION DEVICE FOR GENERATING A LIGHT STRIP AND MOTOR VEHICLE

(75) Inventor: Marcus Pfeil, Winkelhaid (DE)

(73) Assignee: Audi AG, Ingolstadt (DE)

( * ) Notice: Subject to any disclaimer, the term of this patent is extended or adjusted under 35 U.S.C. 154(b) by 284 days.

(21) Appl. No.: 13/600,897

(22) Filed: Aug. 31, 2012

(65) Prior Publication Data

US 2013/0229814 A1    Sep. 5, 2013

(30) Foreign Application Priority Data

Sep. 2, 2011    (DE) .......................... 10 2011 112 322

(51) Int. Cl.
| | |
|---|---|
| *F21V 9/00* | (2006.01) |
| *B60Q 3/02* | (2006.01) |
| *F21V 8/00* | (2006.01) |
| *B60Q 3/00* | (2006.01) |
| *F21S 8/10* | (2006.01) |
| *F21V 21/00* | (2006.01) |

(52) U.S. Cl.
CPC ............... *F21V 21/00* (2013.01); *B60Q 3/0289* (2013.01); *G02B 6/001* (2013.01); *G02B 6/0006* (2013.01); *B60Q 3/004* (2013.01); *F21S 48/00* (2013.01); *B60Q 3/0213* (2013.01)

(58) Field of Classification Search
CPC ........ B60Q 3/002; B60Q 3/004; B60Q 3/005; B60Q 3/0213; B60Q 3/0209
USPC .................................................. 362/489, 551
See application file for complete search history.

(56) References Cited

U.S. PATENT DOCUMENTS

| | | | |
|---|---|---|---|
| 5,590,945 A | 1/1997 | Simms et al. | |
| 5,857,758 A | 1/1999 | Dealey, Jr. et al. | |
| 6,772,559 B1 | 8/2004 | Bouamra et al. | |
| 6,854,869 B1 | 2/2005 | Fernandez | |
| 7,213,952 B2 | 5/2007 | Iwai | |
| 7,307,395 B2 | 12/2007 | Bouamra et al. | |
| 7,980,739 B2 * | 7/2011 | Iwai et al. ..................... | 362/489 |
| 2003/0063888 A1 | 4/2003 | Sahlin et al. | |
| 2005/1084229 | 4/2005 | Babbitt et al. | |
| 2013/0058115 A1 | 3/2013 | Pfeil | |
| 2013/0229815 A1 | 9/2013 | Pfeil | |

FOREIGN PATENT DOCUMENTS

| | | |
|---|---|---|
| CN | 1676372 | 10/2005 |
| DE | 10 2011 015161 A1 | 6/1999 |
| DE | 94 22 405 U1 | 8/2001 |
| DE | 103 41 884 A1 | 4/2005 |

(Continued)

*Primary Examiner* — Robert May
(74) *Attorney, Agent, or Firm* — Henry M. Feiereisen LLC

(57) ABSTRACT

An illumination device can be arranged along a contour of a component in a motor vehicle so that the contour of the component is recognizable in the dark as a bright strip. The illumination device allows producing a light strip along a predetermined distance. For this, the illumination device has a longitudinally shaped light conductor for distributing light along the distance and a coupling-in element which is connected to the light contour for coupling light into the light conductor. The light conductor is supported positionally fixed relative to the component in a region by means of a fixed-bearing device. The coupling in element on the other hand is supported by means of a floating-bearing device for movement relative to the component along at least one direction.

17 Claims, 3 Drawing Sheets

(56) References Cited

FOREIGN PATENT DOCUMENTS

| DE | 699 17 485 T2 | 5/2005 |
| DE | 10 2005 013 837 A1 | 10/2005 |
| DE | 102011112320 | 8/2012 |
| DE | 102011112321 | 8/2012 |
| EP | 1 913 359 A2 | 5/2006 |
| EP | 1 903 359 A2 | 3/2009 |

* cited by examiner

ILLUMINATION DEVICE FOR GENERATING A LIGHT STRIP AND MOTOR VEHICLE

CROSS-REFERENCES TO RELATED APPLICATIONS

This application claims the priority of German Patent Application, Serial No. 10 2011 112 2322.2, filed Sep. 2, 2011, pursuant to 35 U.S.C. 119(a)-(d), the disclosure of which is incorporated herein by reference.

BACKGROUND OF THE INVENTION

The present invention relates to an illumination device for producing a light strip along a predetermined distance on a component.

The following discussion of related art is provided to assist the reader in understanding the advantages of the invention, and is not to be construed as an admission that this related art is prior art to this invention.

In order to allow a person to orient themselves also in the dark inside the motor vehicle, individual components for example a cup holder or a loudspeaker can be illuminated from their interior with a light source. The person can then recognize where the functional element is located in the interior without the entire interior having to be illuminated. The above mentioned illumination device allows distributing the light of a light source along a contour of the respective functional element so that the contour is recognizable in the dark as bright strip. Typically such an illumination device is used for a circumferential illumination, i.e. in this case the strip has the shape of a closed band.

In order to generate a circumferential light strip, a ring-shaped light conductor made of Polymethylmethacrylate (PMMA, Plexiglas®) can be used, into which light is coupled on both ends. The light conductor has the shape of the contour to be represented and can be fixed on or around the component, for example by means of a latching engagement. The light emitting diodes can each be mounted in a coupling-in element in which an electric switch is located for operating the light emitting diode and by which the light of the light emitting diodes is focuses and directed onto a coupling-in surface of the light conductor.

Along its longitudinal extension in the direction of extension of the contour the light conductor has scattering centers, i.e. for example indents on its outer walling or reflecting particles in its interior, by which a portion of the light is deflected and exits the light conductor, thereby distributing the light of the light emitting diodes along the distance. As a result, the light conductor appears evenly bright along the contour. By means of such light conductors a surface of up to 200 mm×150 mm can typically be surrounded by an evenly bright light strip.

When a larger area is to be surrounded with a circumferential light strip the light strip has to have a corresponding length. This results in the problem that thermally caused changes in length of the light conductor can cause mechanical tensions in the material of the light conductor which can lead to hairline cracks in the material or even destruction of the light conductor. In particular, temperatures of between −40 to 80° C. can occur in a motor vehicle.

It would therefore be desirable and advantageous to provide an illumination device which allows generating an evenly bright light strip along the contour of a large-surface area functional element.

SUMMARY OF THE INVENTION

According to one aspect of the present invention an illumination device for generating a light strip along a predetermined distance on a component, includes a longitudinally shaped light conductor for distributing light along the distance, a coupling-in element connected to the light conductor for generating the light and for coupling the light into the light conductor, a fixed-bearing device for supporting a region of the light conductor in a positionally fixed manner relative to the component, and a floating-bearing device by means of which the coupling-in element is supported for movement relative to the component along at least one direction.

The illumination device according to then invention, allows producing a light strip along a predetermined distance on a component (for example a frame for a sunroof opening). For this, the illumination device has a longitudinally shaped light conductor for distributing light along the distance and a coupling-in element which is connected to the light conductor for generating the light and for coupling-in of the light into the light conductor. A region of the light conductor is fixed relative to the component by means of a fixing device. For this, the light conductor can be directly fixed on the component itself or for example on another part with which the component is rigidly mechanically coupled.

The coupling-in element on the other hand is supported with a floating bearing for movement along at least one direction relative to the component. The illumination device according to the invention has the advantage that the coupling-in element can be shifted by the light conductor in case of a thermally caused change of length of the light conductor. In contrast to a coupling-in element which is supported fixed in location the change in length does not subject the light conductor to additional compressive or tensile force, which could cause damage to the light conductor. The fixed-bearing device for the light conductor on the other hand ensures that the light conductor does not shift overall relative to the component during multiple (thermally caused) expansion and shrinking processes.

According to another advantageous feature of the invention, the floating-bearing device can have a support part which is supported fixed in location relative to the component, and the coupling-in device can be coupled with a sled of the floating-bearing device, which sled is shiftable along a sliding direction relative to the support part. This has the advantage that a customary coupling-in element which has not been adapted with regard to its shape in any particular form, can be movably supported.

According to another advantageous feature of the invention, the floating bearing has at least one mounting device which is supported fixed in location relative to the component and which at least partially, preferably completely surrounds the coupling-in device in a plane which is perpendicular to the longitudinal extension of the light conductor. In case of a shaking of the illumination device for example caused during driving over a bumpy road, the coupling-in device is then advantageously prevented from bouncing back and forth on the light conductor.

According to another embodiment of the invention, a slide path of the coupling-in element in the floating-bearing device is limited in a sliding direction by a movably supported stop element. This allows to easily pressing the coupling-in element into the floating-bearing device during manufacture or repair of the illumination device. This advantageously simplifies the mounting or the repair. The stop element is preferably spring-supported.

The last two mentioned features (with mounting device and movable stop element) can be particularly easily realized in combination when the coupling-in element is held in the floating-bearing device by a snap connection.

According to another embodiment of the invention, at least a region of the light conductor can be surrounded by a transparent scattering body. At least a region of the light conductor can be supported for movement along the longitudinal extension of the light conductor relative to the scattering body. The walls of the light conductor can thus slide along an inner walling of the scattering body in the direction of extension of the distance. Advantageously the scattering body enables to provide a closed surface which is visible from the outside and which extends along a contour of the component and which is evenly illuminated from the inside by means of the light conductor. The scattering body is preferably made of a material which has a smaller coefficient of thermal expansion than the material of the light conductor. This allows ensuring that gap sizes between the scattering body and surrounding components do not exceed a predetermined value. The smaller light conductivity of the material of the scattering body which is often associated with a decreased coefficient of thermal expansion does not play a significant role in this case because the conduction of light from the light coupling-in element to the individual exit sites of the light occurs mainly via the light conductor. The latter can expand freely in the scattering body due to the described support.

In the case that a light strip is to be produced along a curved course by means of the illumination device according to the invention, the light conductor has of course also a correspondingly curved course. In this case an angle is enclosed on one hand between a directional vector of the longitudinal extension of the light conductor on the coupling-in element and on the other hand a directional vector of the longitudinal extension of the light conductor on the fixed support device. This angle is preferably smaller than 40°, in particular smaller than 30°. This prevents that the light conductor bends during heating up when shifting the coupling-in device. When a light strip is to be generated along a distance which requires a course of the light conductor with a stronger curvature it is advantageous to arrange multiple of the illumination devices according to the invention along this distance.

During shifting of the coupling-in element due to a change in length of the light conductor, a guiding force can be exerted on the coupling-in element by a part of the floating-bearing device which is supported fixed in location relative to the component. According to an advantageous embodiment of the illumination device according to the invention this guiding force is transferred via two different paths, so that in each case a portion of the entire guiding force is transferred to the coupling-in element via two different transfer regions. The position of the transfer regions is chosen so that the values of the two (partial) guiding forces are equal. This allows avoiding jamming of the coupling-in device during its movement in the floating support device and thus blocking of further movement.

For generating the light, the coupling-in element has preferably at least one light emitting diode. The latter heat up only slightly during operation so that they do not cause any significant thermally caused deformation of components of the coupling-in element.

According to another embodiment of the invention, the illumination device can include a further coupling-in element which is connected to the light conductor in the illumination device according to the invention. This coupling-in element is also supported by means of a further floating-bearing device for movement relative to the component along at least one direction. By feeding in light at two different sites of the light conductor an evenly bright light strip can be generated in a particularly simple manner.

According to another aspect of the present invention a motor vehicle has at least one illumination device which corresponds to an embodiment of the illumination device according to the invention. This motor vehicle has the advantage that contours of great functional elements such as for example a control panel of a dash board, a clove compartment or a handle for a door can be made recognizable in the dark by means of an evenly bright light strip. The illumination device can be exposed to great temperature fluctuations without thereby causing damage to the light conductors or the illumination device being deformed so that a gap forms between the illumination device and a component in which it is encased.

In a vehicle according to the invention, a functional component of the motor vehicle can be surrounded by the at least one illumination device and a light strip which extends around the functional element can thereby be generated. Then the entire contour of the functional element can be recognized in the dark.

Preferably a closable opening is thus surrounded. For example, a door frame can be illuminated thereby allowing a passenger to avoid bumping his head when entering or exiting the vehicle.

In the case that the distance along which a light strip is producible by means of the at least one illumination device has at least one straight section, it is advantageous when the fixed bearing of at least one illumination device is arranged in the straight section. In this case the light conductor which is held by this fixed-bearing device can expand starting form the fixed-bearing device along the straight section. In this case only a relatively small frictional force acts on the light conductor from bordering components as for example a scattering body thus involving a correspondingly small risk of mechanical tension in the light conductor.

In the motor vehicle according to the invention an evenly bright illumination along an angled contour can be provided in a simple manner by arranging at least one coupling-in element in the corner region. It is possible to configure the light conductor in a curved manner near the coupling-in element thereby illuminating the corner region evenly bright. In this case a thermally caused relative change in length of the light conductor between the curved region of the light conductor and near the coupling-in element and the coupling-in element itself is so small that the light conductor is not damaged in this section.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
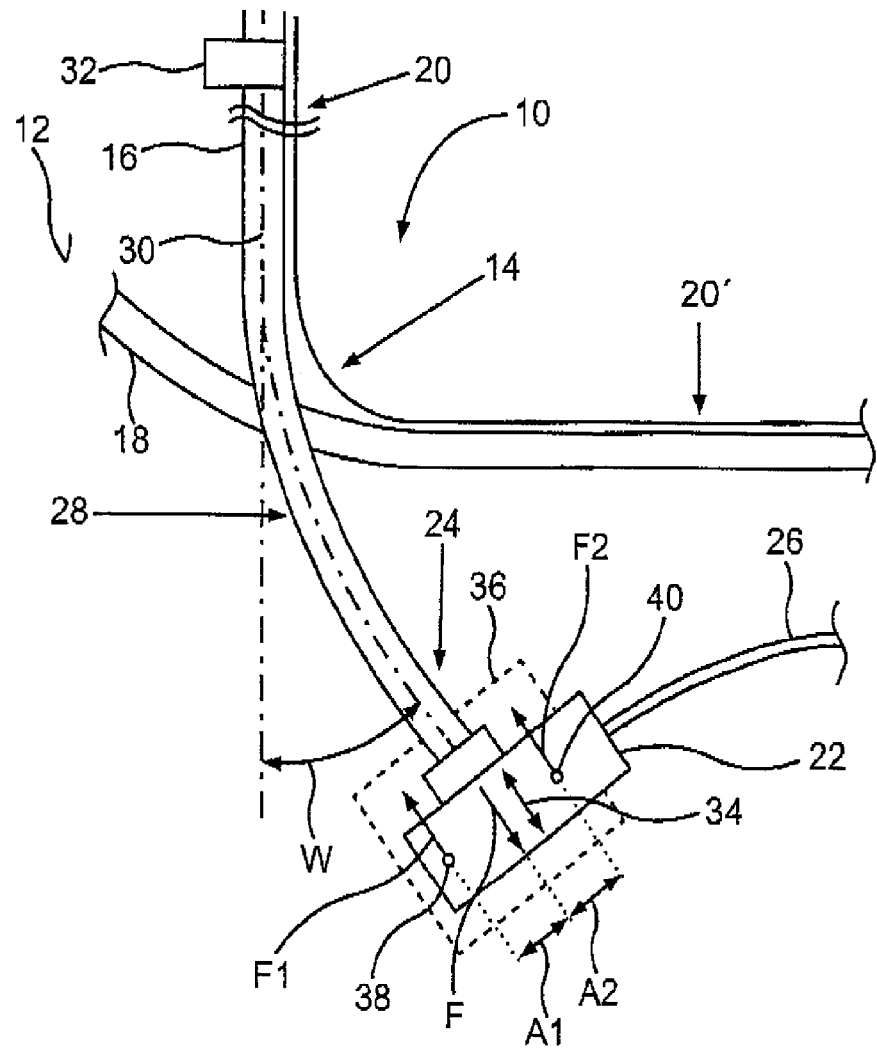
FIG. 1 shows a schematic representation of a illumination device for a sunroof of an automobile, which represents an embodiment of the motor vehicle according to the invention

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sunroof opening 10 of a roof 12 of the automobile. A frame (not shown) surrounds the sunroof opening 10. An illumination device of the frame has a strip-shaped light output which surrounds the sunroof opening 10. Light from the illumination device reaches an inner space of the motor vehicle. As a result the sunroof opening 10 is surrounded by an evenly bright, closed band or strip. FIG. 1 shows a rounded corner 14 of an edge of the sunroof opening 10 as it can be seen from the interior of the automobile in upwards viewing direction, i.e. in the vertical direction of the automobile. FIG. 1 shows the interior of the frame.

For generating the light strip, a total of four light conductors of the illumination device are located in the frame. FIG. 1 shows portions of two of these light conductors 16, 18. The sunroof opening 10 is essentially rectangular. Each of the light conductors is installed along a straight edge of the sunroof opening 10. In FIG. 1 borders 20 and 20' of the roof 12 are shown which each form one of the edges.

The light conductors are made of a transparent material. The material can for example be Polymethylmehtacrylate (PMMA) or a Polycarbonate (PC). Into each of the light conductors light is fed on both ends and propagates in the respective light conductor in the direction of extension of the border 20, 20'. Portions of the light are deflected out of the light conductors by the scattering centers and coupled into a transparent scattering body along the border 20, 20' into which scattering bodies the light conductors are clipped. The light is deflected in the direction toward the border 20, 20' by the scattering bodies where it exits out of the scattering body and reaches the internal space. The light strip on the border 20 is thus formed by the light of the light conductor 16. The scattering body is fixedly connected to the roof 12.

FIG. 1 shows one of the coupling-in elements of the illumination device which is here referred to as feed-in unit 22. The feed-in unit 22 is received on an end region 24 of the light conductor 16. Inside the feed-in unit 22 are a light emitting diode and an associated electrical circuit by which the light emitting diode is supplied with electric energy from an electric on board power supply of the automobile. For this the circuit is connected to the on board power supply via a flexible cable 26. The light of the light emitting diode is pooled inside a light sealed housing 28 of the feed-in unit 22 and coupled into the light conductor 16. The remaining coupling-in elements are constructed in the same manner as the feed-in unit 22. A distance of the feed-in unit 22 to the corner 14 is smaller than ten percent of the length of the straight border 20. In other words the feed-in unit 22 is arranged in a corner region of the sunroof opening 10. The remaining coupling-in elements are also arranged in respective corner regions of the border of the sunroof opening 10.

The light conductor 16 has a longitudinal shape. In the shown example the light conductor is formed by a rod, which for example can be formed by means of an injection molding process. In the corner region the light conductor has a curvature 28. The light conductor 18 is also curved in the corner region. Due to the curvature a distance of the light conductor 16 to the corner 14 and a corresponding distance of the light conductor 18 to the corner 14 is so small that for a person present in the inner space the light strip appears as bright in the corner 14 as along the straight borders 20, 20'.

A thermal coefficient of the light conductor 16 is so great that a length of the light conductor 16 can change by more than 5 mm along a longitudinal axis 30 of the light conductor 16 due to a heating up or cooling down (as it can occur in automobiles for example in the summer or winter). In the scattering body, the light conductor 16 is fixed in the direction of its length i.e. in the direction of the extension of the longitudinal axis 30 only at one site with a fixing device 32. The fixing device 32 is located in a center fifth of the straight border 20. The light conductor 16 can be held by the fixing device 32 for example by means of a bonding connection or a form fitting connection. In the remaining part of the scattering body i.e. at a distance to the fixing device 32, the light conductor 16 can slide in the scattering body along its longitudinal axis 30.

When the light conductor 16 expands due to heating up and thereby lengthens in the direction of the longitudinal axis 30, its end region exerts a force F on the feed-in unit 22. This causes the feed-in unit 22 to move in the direction of a sliding path 34. For this, the feed-in unit 22 is fastened to a sled 36 which is floatingly supported relative to the roof 12. The feed-in unit 22 can for example be bonded to the sled 36 or snapped into the latter.

The sled 36 is pushed onto two rails (not shown) which are fixedly connected to the roof 12. During the movement of the sled 36, the two rails exert a guiding force F1 or F2 on the sled. The feed-in unit 22, the sled 36 and the rails are arranged relative to one another so that similar values of the guiding forces F1, F2 result. This prevents jamming of the sled 36 on the rails. In order to achieve forces F1, F2 of similar magnitude, the feed-in unit 22 is fastened to the sled 36 so that distances A1, A2 are equal, which have points 38, 40 on which the guiding forces F1, F2 effectively act on the sled 36 to the length of the longitudinal axis 30 of the light conductor 16 in the end region 24.

Also at very high temperatures for example 70° C. when the light conductor 16 has almost reached its maximal predetermined extension, the force F always acts along the sliding path 34. In addition, the curvature 28 is chosen so that an angle W which results between a direction of extension of the longitudinal axis 30 on the fixing device 32 and a direction of extension of the longitudinal axis in the end region 24 is smaller than 40°. Preferably, the angle is not greater than 30°.

At the other end of the light conductor 16, a coupling-in element is located as well which is supported in the same manner relative to the roof 12 as the feed-in unit 22. The remaining light conductors of the illumination unit of the automobile are also each supplied with light from two floatingly supported coupling-in elements. The remaining light conductors are also fixed in respective center regions of the straight borders of the sunroof opening 10 relative to the roof 12.

Figure 2:
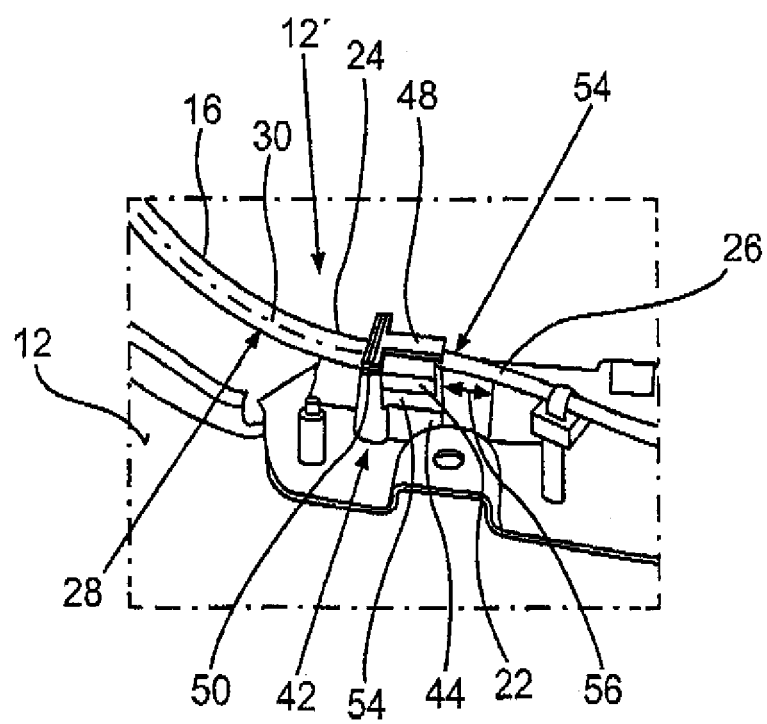
FIG. 2 shows a schematic representation of a perspective view of an illumination device for a sunroof of a further automobile which represents different embodiment of the motor vehicle according to the invention.
Figure 3:
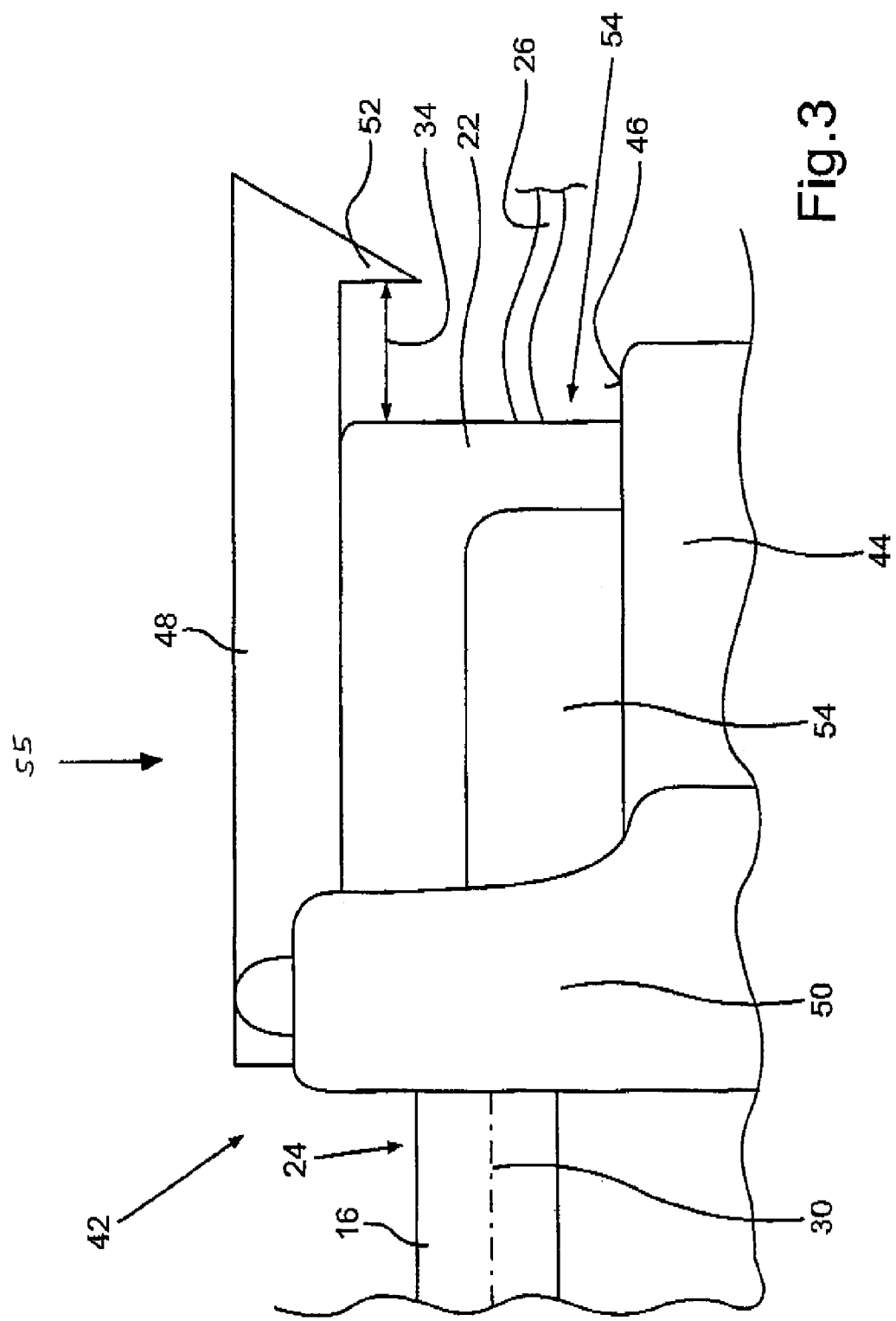
FIG. 3 shows a schematic representation of a side view of a coupling-in element of the illumination device of FIG. 2.

In the following, a further floating-bearing device 42 for a feed-in unit 22 is described by way of FIG. 2 and FIG. 3. For example, instead of the sled 36 the floating-bearing device 42 can be installed in an automobile. For better orientation, elements which correspond in their function to elements of FIG. 1 are provided with the same reference signs as in FIG. 1.

The floating-bearing device 42 is fixedly connected with a support part 12' which is fastened on the roof 12 of the automobile. The floating-bearing device 42 can for example be connected to the support part 12' by molding in an injection molding process.

The floating-bearing device 42 includes a mounting device 55. The mounting device includes a block 44 with a smooth surface 46 on which the feed-in unit 22 is held by a snap connection. The snap connection is enabled by a flexible plastic arm 48 which is formed on a frame 50 of the bearing device 42.

On the surface 46, the feed-in unit 22 can slide along a sliding path 34. A protrusion 52 of the plastic arm 48 forms a spring-supported stop element which limits the sliding path 34 along one of the two possible sliding directions 56. The feed-in unit 22 can move on the surface 46 only along a direction of extension of a longitudinal axis 30 of an end region 24 of a light conductor 16. The end region 24 of the light conductor 16 is connected to the feed-in unit 22.

A movement of the feed-in unit 22 perpendicular to both exclusively possible sliding directions 56 is limited on one hand by the surface 46 and the plastic arm 48, and on the other hand by the frame 50 and the side walls 54. In FIG. 2 and FIG. 3 only one of the side walls 54 is shown. The other side wall 54 in the representations of FIG. 2 and FIG. 3 is covered by the feed-in unit 22. Overall, a transverse movement of the feed-in unit 22 in a plane which is perpendicular to the longitudinal axis 30 is blocked. A plane which is perpendicular to the longitudinal axis means a plane whose normal vector is arranged parallel to a directional vector of the longitudinal axis 30 in the end region 24.

The feed-in unit 22 is rotatively fixed relative to the light conductor 16 by the frame 50; this means that the feed-in unit 22 cannot rotate about the longitudinal axis 30 of the light conductor 16.

Overall, a relative position of the end region 24 of the light conductor 16 on one hand, and the feed-in unit 22 on the other hand does not change even when the feed-in unit 22 moves. In this way a constant light stream always enters the light conductor 16 when operating the feed-in unit 22.

When the feed-in unit 22 moves along the sliding path 34, guiding forces act on the feed-in unit 22 that are symmetrical with regard to the longitudinal axis 30. This prevents jamming of the feed-in unit 22 in the floating-bearing device 42.

The snap connection which is formed by the plastic arm 48 makes it possible to remove the feed-in unit 22 from the floating bearing 42 in a simple manner in case of damage to the feed-in unit 22 and to replace the latter by a new coupling-in element.

The examples show how an illumination with fixed bearing and floating bearing arrangement enables an expansion in the case of temperature fluctuations. In an application with direct illumination, i.e. an illumination which is visible by a person in the automobile, the light conductor is guided longitudinally shiftable in a scattering disc having a low coefficient of thermal expansion. The light sources i.e. the coupling-in elements have to be floatingly supported in some cases. For this, the coupling-in element together with the light emitting diodes is floatingly received on a support component. Two options for technical implementation are described here: either the standard coupling-in element with light emitting diodes is received by a sled which is floatingly supported in a support component, or the support component has a latching receptacle for the coupling-in element with sufficient play.

The described illumination devices allow generating a circumferential illumination of a large surface area component without visible interruption along a surface through which the light is emitted.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An illumination device for generating a light strip along a predetermined distance on a component, comprising:
   a longitudinally shaped light conductor for distributing light along the distance;
   a coupling-in element connected to the light conductor for generating the light and for coupling the light into the light conductor;
   a fixed-bearing device for supporting a region of the light conductor in a positionally fixed manner relative to the component; and
   a floating-bearing device by means of which the coupling-in element is supported for movement relative to the component along at least one direction.

2. The illumination device of claim 1, wherein the floating-bearing device has a support part which is supported fixed in location relative to the component, wherein the floating-bearing device has a sled shiftable along a sliding direction relative to the support part, and wherein the coupling-in element is connected with the sled.

3. The illumination device of claim 1, wherein the floating-bearing device has at least one mounting device which is supported fixed in location relative to the component and which surrounds at least a region of the coupling-in device in a plane perpendicular to a direction of a longitudinal extension of the light conductor.

4. The illumination device of claim 1, wherein the at least one mounting device surrounds the coupling-in device in its entirety.

5. The illumination device of claim 1, further comprising a movably supported stop element, wherein a sliding path of the coupling-in element in the floating-bearing device is limited in a sliding direction by the movably supported stop element.

6. The illumination device of claim 1, further comprising a spring-supported stop element, wherein a sliding path of the coupling-in element in the floating-bearing device is limited in a sliding direction by the spring-supported stop element.

7. The illumination device of claim 1, wherein the coupling-in element is held in the floating-bearing device by a snap connection.

8. The illumination device of claim 1, further comprising a transparent scattering body surrounding at least a region of the light conductor, wherein at least a region of the light conductor is supported for shifting relative to the longitudinal axis.

9. The illumination device of claim 1, wherein the light conductor extends in a curved course, wherein an angle which is enclosed between a direction vector which defines a direction of a longitudinal extension of the light conductor on the coupling in element and a direction vector which defines a direction of a longitudinal extension of the light conductor on the fixed-bearing device, is smaller than 40°.

10. The illumination device of claim 9, wherein the angle is smaller than 30°.

11. The illumination device of claim 1, wherein the floating-bearing device further comprises a part which is supported fixed in location relative to the component, wherein first and second guiding forces are transferable to the coupling-in element via two respective transfer regions of the coupling-in element when the coupling-in element moves along said part as a result of a change in length of the light conductor, and wherein the first guiding force is equal in value to the second guiding force.

12. The illumination device of claim 1, further comprising a further coupling-in element and a further floating-bearing device, wherein the further coupling device is connected with the light conductor and is supported by the further floating-bearing device for movement relative to the component along the at least one direction.

13. A motor vehicle, comprising:
  at least one illumination device for generating a light strip along a predetermined distance on a component, said illumination device which comprising
  a longitudinally shaped light conductor for distributing light along the distance
  a coupling-in element connected to the light conductor for generating the light and for coupling the light into the light conductor,
  a fixed-bearing device for supporting a region of the light conductor in a positionally fixed manner relative to the component, and
  a floating-bearing device by means of which the coupling-in element is supported for movement relative to the component along at least one direction.

14. The motor vehicle of claim 13, wherein the at least one illumination device is constructed as a light strip and surrounds a functional element of the motor vehicle.

15. The motor vehicle of claim 13, wherein the at least one illumination device is arranged in a frame for a roof opening of a sunroof.

16. The motor vehicle according of claim 13, wherein the predetermined distance includes at least one straight section, and wherein the fixed-bearing device is arranged in the straight section.

17. The motor vehicle of claim 13, wherein the predetermined distance includes least one corner region, and wherein at least one of said coupling-in element is arranged in the corner region.

* * * * *